United States Patent [19]
Harvey et al.

[11] Patent Number: 5,744,525
[45] Date of Patent: Apr. 28, 1998

[54] STABILIZED VINYL CHLORIDE COMPOSITION

[75] Inventors: Heather Blue Harvey, Hyde; Joseph William Burley, Warrington, both of United Kingdom; Gerard Hub Frans Schmets, Horn, Netherlands

[73] Assignee: Akros Chemicals, Eccles, United Kingdom

[21] Appl. No.: 663,179

[22] PCT Filed: Dec. 9, 1994

[86] PCT No.: PCT/GB94/02691

§ 371 Date: Sep. 3, 1996

§ 102(e) Date: Sep. 3, 1996

[87] PCT Pub. No.: WO95/16739

PCT Pub. Date: Jun. 22, 1995

[30] Foreign Application Priority Data

Dec. 17, 1993 [GB] United Kingdom ............... 9325849

[51] Int. Cl.$^6$ .................. C08K 5/45; C08K 5/3472; C08K 5/15

[52] U.S. Cl. .................. 524/84; 524/104; 524/105; 524/111

[58] Field of Search ............... 524/84, 104, 111, 524/105, 109; 549/313, 318, 319, 62, 65, 66; 548/356

[56] References Cited

U.S. PATENT DOCUMENTS 3,306,909  2/1967  Uloth ..................... 548/544
5,093,503  3/1992  Meul et al. ............... 549/62

FOREIGN PATENT DOCUMENTS 2184436  6/1987  United Kingdom.

*Primary Examiner*—Veronica P. Hoke
*Attorney, Agent, or Firm*—Duane, Morris & Heckscher LLP

[57] ABSTRACT

Vinyl chloride resins are thermally stabilized by incorporating a heterocyclic compound, as represented by Compound A, disclosed herein, which when in the radical, A=S, are thiophene derivatives, when A=—NR, are pyrrolidone derivatives, and when A=O, are tetronic derivatives.

13 Claims, No Drawings

STABILIZED VINYL CHLORIDE COMPOSITION

The present invention relates to stabilised vinyl chloride polymer compositions.

Many articles are made by moulding, extruding and casting homo-polymers and co-polymers of vinyl chloride. These processes involve heating the polymer or co-polymer to temperatures in the order of 180° C. to 200° C. At such temperatures the vinyl chloride polymers and co-polymers undergo considerable degradation, resulting in an adverse colour change. The high temperatures further adversely affect the mechanical properties of the end product.

To overcome such problems, inorganic salts as well as carboxylic acid salts of metals have been added to the PVC. The performance of such materials in retarding the degradation of the polymer is enhanced by the further addition of co-stabilising additives such as organophosphites, epoxidised esters or oils, hindered phenolic antioxidants and polyols.

U.S. Pat. Nos. 2,307,075 and 2,669,548 describe the beneficial effects of adding metal chelates of dicarbonyl compounds to the PVC, whereas GB 1511621 describes the further improvements offered by a stabilising composition comprising divalent metal salts of carboxylic acids together with an organic dicarbonyl compound.

The present invention seeks to provide an alternative stabilisation system.

According to the present invention there is provided a composition based on homopolymers and/or co-polymers of vinyl chloride comprising the following compounds, expressed by weight relative to the weight of polymers/co-polymers:

(a) from 0.1% to 5% of one or more organotin salts and/or one or more divalent metal salts of a carboxylic acid or phenol; and
(b) from 0.001% to 5% of one or more organic compounds of the general formula:

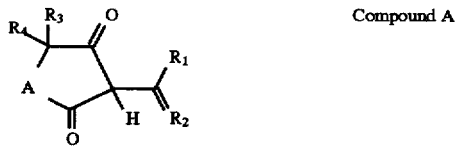

Compound A in which $R_1$ represents a linear or branched alkylene or alkenylene radical having up to 20 carbon atoms, an aralkylene radical having from 7 to 20 carbon atoms or an arylene or cycloalkylene radical having from 6 to 20 carbon atoms, the cycloalkylene radicals optionally containing carbon-carbon double bonds; these radicals optionally being unsubstituted or substituted, by one or more halogen atoms or hydroxyl groups or, for aryl or cycloalkylene radicals, by one or more methyl, ethyl or methoxy radicals, the above mentioned radicals optionally also being modified, by the presence in an aliphatic chain of one or more —O—, —CO— or —CO$_2$— chain members; $R_3$ and $R_4$ are defined as $R_1$ or H and can be the same or different; A is either O, S or $NR_7$ with $R_7$ defined as $R_1$ or H; with the exception that when $R_2$=O, A≠O; and $R_2$ represents O, $NR_5$ or $NNHR_5$ wherein $R_5$ is defined as $R_1$, H or $C(S)NHR_6$ wherein $R_6$ is defined as $R_1$ or H; or $R_2$ represents the following:

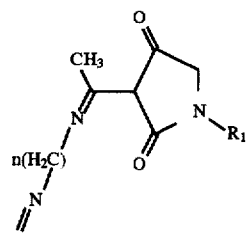

wherein n is an integer between 1 and 10.

Preferably the composition comprises from 0.001% to 1% of compound A.

Amongst these compounds "A" can be mentioned the following:

N-phenyl-3-[2-isopropylamine)ethylidene]-pyrrolidine-2,4-dione,
N-phenyl-3-acetyl-5-methylpyrrolidine-2,4-dione,
N-p-methoxyphenyl-3-acetylpyrrolidine-2,4-dione,
N-benzyl-3-acetylpyrrolidine-2,4-dione,
N-isopropyl-3-acetylpyrrolidine-2,4-dione,
N-phenyl-3-acetylpyrrolidine-2,4-dione,
3-[2-(4-methylphenylhydrazine)-ethylidene]-tetronic acid
N-methyl-3-acetylpyrrolidine-2,4-dione,
N-phenyl-3-[2-(isopropylamino)ethylidene]-pyrrolidine-2,4-dione
N-p-methylphenyl-3-acetylpyrrolidine-2,4-dione,
3-[2-(4-methylphenyl-hydrazine)-ethylidene]-tetronic acid
N-phenyl-3-benzoylpyrrolidine-2,4-dione,
3-acetyltetrahydrothiophen-2,4-dione, or

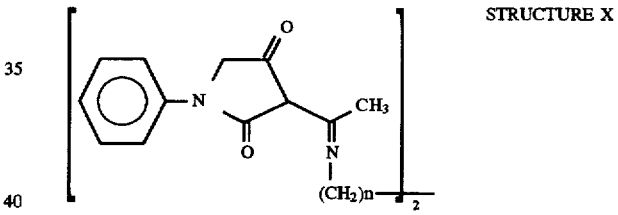

STRUCTURE X where n=1, 1.5,2,2.5,3,3.5,4,4.5 or 5.

The best all round performance is obtained with the product N-phenyl-3-acetylpyrrolidine-2,4-dione (Compound B).

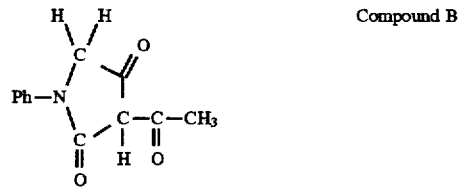

Compound B

Thus relating back to the general formula A; $R_1$=alkyl, $R_2$=O, $R_3$=$R_H$=H and A=$NR_7$ where $R_7$=phenyl.

Favourable results have also, however, been obtained with the following products:

(a) A=$NR_7$, $R_1$=methyl, $R_2$=O, $R_3$=$R_4$=H where $R_7$=methyl, isopropyl, benzyl, p-tolyl and p-methoxyphenyl i.e. where $R_7$=alkyl, aralkyl and substituted phenyl respectively;
(b) A=$NR_7$, $R_1$=aryl, $R_2$=O, $R_3$=$R_4$=H, $R_7$=phenyl;
(c) A=$NR_7$, $R_1$=methyl, $R_2$=O, $R_3$=methyl, $R_4$=H, $R_7$=phenyl;
(d) A=N-phenyl, $R_1$=methyl, $R_3$=$R_4$=H, $R_2$=NH-alkyl and when $R_2$=N-alkyl.

The synthesis of the pyrrolidine compounds named above is described by R. N. Lacey in J.Chem.Soc. 1954, pages 850–854. The synthesis of the tetronic acid derivatives is described in J.Chem.Soc. 1943, pages 241–242 by W. Baker, K. D. Grice and A. B. A. Jansen and of the 3-acetyltetrahydrothiophen-2,4-dione in J.Chem.Soc 1968, pages 1501–1505.

The heat stability of the compounds mentioned above in polyvinyl chloride formulations have been established.

The phrase "compositions based on polyvinyl chloride" used herein should be understood to include compositions comprising any homopolymer of co-polymer of vinyl chloride including chlorinated vinyl chloride polymers and optionally any adjuvants employed to facilitate processing or to enhance the properties of the end product.

Any suitable organotin salt may be used such as methyl-, butyl-, and octyltin carboxylate, maleic acid half ester and mercaptoester salts.

The divalent metal salts of carboxylic acids preferably comprise barium, cadmium, zinc, calcium, magnesium or (less desirably) lead salts of saturated or unsaturated aliphatic acid or aromatic acids. In the case of zinc, basic (acid deficient) salts may optionally be employed. Barium and calcium salts of phenol or substituted phenols and optionally basic (carbonated) phenate and carboxylate salts of these metals can also be employed. The metal salts are preferably provided in combinations such as barium-cadmium salts, barium-zinc salts or calcium-zinc salts. Suitable salts include acetates, ethyl hexanoates, octoates, stearates, oleates, laurates, palmitates, myristates, ricinoleats, benzoates (including alkyl substituted benzoates) phthalates, phenates and nonyl phenates. Optionally these divalent metal salts can be used in combination with carboxylic acid salts of monovalent metals, for example sodium, potassium and/or trivalent metals, for example aluminium. Furthermore, inorganic metal salts can be included. Such products can be oxides, carbonates, sulphates, perchlorates, magnesium/aluminium and magnesium/aluminium/zinc hydroxycarbonates, calcium/aluminium hydroxycarbonates, calcium/aluminium hydroxyphosphite products.

Optional adjuvants include any of the following: organophosphite esters, for example triaryl phosphites such as triphenyl phosphite, tris(nonylphenyl)phosphite, tris(2,4-di-t-butylphenyl)phosphite, alkaryl phosphites such as monooctyl diphenylphosphite, dioctylphenyl phosphite, mixed alkyl nonylphenyl phosphites, trialkyl phosphites such as tridecyl phosphite, trioleyl phosphite, tristearyl phosphite, oligo phosphites such as those based on pentaerythritol, dipropylene glycerol and bisphenols.

Antioxidants, for example, phenolic antioxidants such as 2,6-di-t-butyl-4-methylphenol, styrenated phenol, 2,2′-methylene bis(4-methyl-6-t-butylphenol), 2,2′-bis-(4-hydroxyphenol) propane, octadecyl-3-(3′,5′-di-t-butyl-4-hydroxyphenol) propionate, pentaerythritol tetrakis [3′,5′-di-t-butyl-4-hydroxyphenol)propionate].

Ultraviolet absorbers, for example benzophenones such as 2-hydroxy-4-methoxybenzophenone, 2-hydroxy-4-octoxybenzophenone, benzotriazoles such as 2-(2′-hydroxy-5′-methylphenyl)benzotriazole, salicylates such as phenyl salicylate, nickel salts such as nickel bis(octylphenyl sulphide) and nickel bis [O-ethyl(3,5-di-t-butyl-4-hydroxybenzyl)]phosphonate, hindered amines such as bis (2,2,6,6-tetramethylpiperidinyl-4)sebacate.

Polyol co-stabilisers such as pentaerythritol, dipentaerythritol, tris(hydroxyethyl) isocyanurate, mannitol, sorbitol, trimethylolpropane, glycerol, propylene glycol, ditrimethylolpropane and the esters of these products formed with aliphatic and aromatic monocarboxylic or dicarboxylic acids.

Antistatic agents such as ethylene condensates, carbowax, glycerol monostearate, alkylsulphonates.

Lubricants such as calcium stearate, zinc stearate, fatty acid esters and amides, distearyl phthalate, stearyl alcohol, stearic acid, polyethylene wax.

Flame retardants such as antimony trioxide, aluminium hydroxide, zinc stannate.

The homopolymers and co-polymers can be used in rigid or flexible formulations. In flexible formulations commonly used plasticisers include, for example, phthalic acid esters such as dimethyl phthalate, dibutyl phthalate, dioctyl phthalate, diisodecyl phthalate, aliphatic monobasic acid esters such as butyl oleate, glycerol monoleate, butyl stearate, octyl stearate, butyl epoxy stearate, octyl epoxy stearate, epoxidised soya bean oil, epoxidised linseed oil, aliphatic dibasic acid esters such as diisodecyl adipate, dioctyl adipate, dibutyl adipate, higher molecular weight (polymeric plasticisers) based on dibasic acids would also be included, as would trimellitate esters and phosphoric acid esters such as tributyl phosphate, triphenyl phosphate, tri-2-ethylhexyl phosphate.

In rigid formulations it is possible to include impact modifiers such as, for example, chlorinated polyethylene, butadiene/styrene co-polymers or butadiene/styrene/acrylonitrile terpolymers. Acrylic impact modifiers and process aids can also be included.

Miscellaneous additives such as fillers and pigments could be used in both the flexible and rigid polymer applications.

The stabilisers according to the invention can be incorporated at the same time as the other adjuvants. Alternatively, they may be combined with certain of the additives to produce a stabiliser composition which can then be subsequently incorporated into the chlorinated polymer. Methods of production of such stabilising combinations are well known within the industry.

Various methods are available for the processing of stabilised PVC formulations these include calendering, rotational moulding, spread coating, slush moulding, extrusion, injection moulding, blow-moulding. The stabiliser compositions described by the invention can be used in accordance with each of these techniques.

The following examples provide additional information to further illustrate the invention.

EXAMPLES 1–3

A The sample compounds were tested in the formulation given below which can be used for the manufacture of bottles

| Composition A - all amounts are given in phr. | |
| --- | --- |
| Suspension polymerised PVC resin (K-57) | 100 |
| Impact modifier, a co-polymer of methylmethacrylate butadiene and styrene (sold under the trade name) Paraloid BTA736S) | 13 |
| Process aid (Paraloid K175) | 1 |
| Expoxidised Soya Bean Oil | 5 |
| Calcium Stearate | 1 |
| Zinc Stearate | 0.7 |
| Tris(nonylphenyl) phosphite | 0.3 |

121 g of this mixture was taken as example 1. For examples 2 and 3, 121 g of Composition A was combined with 0.02 g of stearoylbenzoyl methane (sold under the trade name Rhodiastab 50) and N-phenyl-3-acetylpyrrolidine-2, 4-dione respectively.

The mixtures were mixed by hand before being placed on an oil heated rolling mill under the conditions described in Table 1. After the milling time, the samples were removed as sheets. Test pieces of size 410 mm×20 mm were cut from the prepared sheets and placed in a test oven at 180° C. (Mathis Thermotester Type LTF-ST). The yellowness index (YI of the test sample) was determined according to BS2782:Part 5, Method 530A. The results are shown in Table 2.

TABLE 1

| Mill Conditions | |
|---|---|
| Roll diameter | 110 mm |
| Front roll temperature | 165° C. |
| Back roll temperature | 161° C. |
| Front roll speed | 26.6 rpm |
| Friction Ratio | 1.10 |
| Nip thickness | 0.5 mm |
| Milling time | 3 mins |

TABLE 2

| | Y.I. after oven test in minutes | | | | | |
|---|---|---|---|---|---|---|
| Example | 2 | 6 | 10 | 14 | 18 | 20 |
| 1 | 45 | 76 | 96 | 106 | 106 | 107 |
| 2 | 32 | 42 | 45 | 51 | 61 | 70 |
| 3 | 21 | 32 | 40 | 50 | 59 | 62 |

B EXAMPLES 4–9

The example compounds were tested in the semi-rigid, pigmented PVC formulation below, which uses a barium-zinc stabiliser system.

| Composition B | |
|---|---|
| Suspension polymerised PVC resin (K-64) | 100 |
| Dioctyl phthalate | 27.5 |
| Epoxidised alkyltallate | 3 |
| Stearic Acid | 0.26 |
| Titanium dioxide (sold as the trade name R-TC30) | 10 |
| Diphenyl isooctyl phosphite | 0.67 |
| Diphenyl phosphite | 0.05 |
| Basic zinc octoate (22% Zn) | 0.12 |
| Carbonated barium alkylphenolate (28% Ba) | 0.38 |
| Butoxyethoxyethanol | 0.27 |

71.13 g of Composition B was taken as example 4. For examples 5–9 this amount of Composition B was combined with 0.01 g of dibenzoylmethane, 0.01 g of N-phenyl-3-benzoylpyrrolidine-2,4-dione, Compound with structure X, n=3, N-p-methoxyphenyl-3-acetylpyrrolidine-2,4-dione, and 3-acetyl-2,4-dioxotetrahydrothiophen respectively. These mixtures were treated in an identical manner to that described in section A, apart from the mill nip thickness which was 0.4 mm. The yellowness indices are given in table 3.

TABLE 3

| | Y.I. after oven test in minutes | | | | | | | |
|---|---|---|---|---|---|---|---|---|
| Example | 0 | 2 | 4 | 6 | 8 | 10 | 12 | 14 |
| 4 | 3.6 | 4.6 | 6.5 | 13.9 | 18.5 | 22.6 | 25 | 26.5 |
| 5 | 3.3 | 4.1 | 4.7 | 8 | 14.9 | 18 | 21.3 | 23.8 |
| 6 | 3.6 | 3.8 | 4 | 4.5 | 6 | 7 | 9.4 | 12.2 |
| 7 | 2.5 | 3.1 | 3.1 | 3.2 | 3.7 | 4.3 | 5.6 | 7.2 |
| 8 | 2.6 | 2.8 | 3.1 | 3.2 | 3.7 | 4.6 | 5.2 | 6.8 |
| 9 | 2.9 | 2.9 | 3.1 | 4.3 | 6 | 10.5 | 13.3 | 16.3 |

C EXAMPLES 10–13

The example compounds were tested in the semi-rigid, pigmented PVC formulation using the dynamic mill stability test. The Barium-Zinc stabilised system described in Composition B was taken as the base formulation for this test.

Example 4 is 142.25 g of Composition B, and example 5 is 142.25 g of Composition B combined with 0.02 g of dibenzoylmethane. Examples 10–13 respectively are 142.25 g of Composition B combined with 0.02 of N-phenyl-3-acetylpyrrolidine-2,4-dione, 0.02 g of N-isopropyl-3-acetylpyrrolidine-2,4-dione, 0.02 g of N-phenyl-3-[2-(isopropylamino)ethylidene]pyrrolidine-2,4-dione and 0.02 g of N-phenyl-3-acetyl-5-methylpyrrolidine-2,4-dione. These mixtures were mixed by hand before being placed on an oil heated rolling mill under the conditions described in Table 4. Test pieces of size 20 mm×30 mm were taken from the mill at 5 minute intervals and the yellowness index measured according to the procedure described under BS2782:Part 5; Method 530A. The results are shown in Table 5.

TABLE 4

| Mill Conditions | |
|---|---|
| Roll diameter | 152 mm |
| Front roll temperature | 183° C. |
| Back roll temperature | 180° C. |
| Front roll speed | 28.8 rpm |
| Friction Ratio | 1.04 |
| Nip thickness | 1.3 mm |

TABLE 5

| | Y.I. after mill stability test in minutes | | | | | |
|---|---|---|---|---|---|---|
| Example | 0 | 5 | 10 | 15 | 20 | 25 |
| 4 | 5.6 | 12 | 17.8 | 20 | 22.1 | 21.3 |
| 5 | 3.8 | 7.7 | 8.7 | 10.6 | 14.3 | 15.7 |
| 10 | 3.2 | 3.8 | 4.6 | 5.3 | 6.2 | 7.9 |
| 11 | 3.5 | 4.0 | 4.5 | 5.3 | 7.3 | 9.4 |
| 12 | 3.4 | 4.2 | 4.9 | 5.9 | 7.5 | 9.7 |
| 13 | 3.7 | 4.4 | 5.1 | 5.7 | 7.5 | 9.6 |

D EXAMPLES 14–17

The examples below use a flexible clear PVC formulation incorporating a calcium/zinc stabiliser system.

| Composition D | |
|---|---|
| Suspension polymerised PVC resin (K-71) | 100 |
| Dioctyl phthalate | 45 |
| Epoxidised alkyltallate | 3 |
| Stearic Acid | 0.26 |
| Diphenyl isooctyl phosphite | 1 |
| Basic zinc octoate (22% Zn) | 0.12 |
| Carbonated Calcium Carboxylate (10% Ca) | 0.3 |
| Butoxyethoxyethanol | 0.61 |

75.15 g of Composition D was taken as example 14. For examples 15–17 this amount of Composition D was combined with 0.015 g of dibenzoylmethane; 0.015 g of N-isopropyl-3-acetylpyrrolidine-2,4-dione and with 0.015 N-benzyl-3-acetylpyrrolidine-2,4-dione respectively. These mixtures treated in an identical manner to that described in Section B. The yellowness indices are given in table 6.

TABLE 6

| | Y.I. after oven stability test in minutes | | | | | | |
|---|---|---|---|---|---|---|---|
| Example | 0 | 4 | 8 | 12 | 16 | 20 | 24 |
| 14 | 3.2 | 3.6 | 4.4 | 6.9 | 8.5 | 10.0 | 10.3 |
| 15 | 4.0 | 4.3 | 4.5 | 5.4 | 6.3 | 7.2 | 7.5 |
| 16 | 2.9 | 2.9 | 3.0 | 5.0 | 5.1 | 7.2 | 9.0 |
| 17 | 2.6 | 2.7 | 3.4 | 4.8 | 5.0 | 6.5 | 8.7 |

E EXAMPLES 18–21

The examples below use a flexible clear PVC plastisol formulation with a Barium/Zinc stabiliser system

| Composition E | |
|---|---|
| Emulsion PVC resin (K-72) | 100 |
| Dioctylphthalate | 50 |
| Carbonated Barium Alkylphenolate (28% Ba) | 0.5 |
| Basic zinc octoate (22% Zn) | 0.16 |
| Diphenyl isooctyl phosphite | 0.9 |
| Diphenyl phosphite | 0.2 |
| Butoxyethoxyethanol | 0.21 |

151.97 g of Composition E were taken as example 18. For examples 19–21 this amount of Composition E was combined with 0.03 g of dibenzoylmethane; 0.03 g of N-benzyl-3-acetylpyrrolidine-2,4-dione; 0.03 g of 3-[2-(4-methylphenyl-hydrazine)-ethylidene]-tetronic acid.

The compositions described above were mixed initially by hand and then using the laboratory triple roll mill for a period of 10 minutes. The blends were then deaerated using a Collin (type 110) laboratory mixer before being spread on to a release paper to a thickness of 0.5 mm. The plastisols were then gelled at 185° C. for 1 minute. Test pieces of size 410 mm×20 mm were cut from the gelled sheet and placed in a test oven at 180° C. (Mathis Themotester Type LTF-ST). The yellowness index of the test sample was determined according to BS2782:Part 5; Method 530A. The results are shown in table 7.

TABLE 7

| | Y.I. after oven stability test in minutes | | | | | | | |
|---|---|---|---|---|---|---|---|---|
| Example | 0 | 1 | 2 | 3 | 4 | 5 | 6 | 7 |
| 18 | 28.4 | 36 | 46 | 52 | 67.4 | 87.4 | 102 | 115 |
| 19 | 16 | 18.6 | 22.3 | 30 | 37.3 | 66 | 80.4 | 96.4 |
| 20 | 13.6 | 14.2 | 15 | 16 | 17.7 | 28.2 | 35 | 50 |
| 21 | 15.3 | 17.2 | 22 | 28 | 38.3 | 53.4 | 70.9 | 81 |

F. EXAMPLES 22–25

The examples below use a white pigmented PVC plastisol formulation, stabilised by a Barium/Zinc composition.

| Composition F | |
|---|---|
| Emulsion PVC resin (K-72) | 100 |
| Dioctylphthalate | 50 |
| Titanium dioxide sold under the trade name Tioxide RFC-5 | 10 |
| Carbonated Barium Alkylphenolate (28% Ba) | 0.5 |
| Basic zinc octoate (22% Zn) | 0.16 |
| Diphenyl isooctylphosphite | 0.9 |
| Diphenylphosphite | 0.2 |
| Butoxyethoxyethanol | 0.21 |

161.97 g of Composition F were taken as example 22. For examples 23–25 this amount of Composition F was combined with 0.03 g of dibenzoylmethane, 0.03 g of N-phenyl-3acetyl-5-methylpyrrolidine-2,4-dione; 0.03 g of N-phenyl-3-acetylpyrrolidine-2,-4-dione. These mixtures were treated in exactly the same manner as that described in section E. The yellowness indices are given in table 8.

TABLE 8

| | Y.I. after oven stability test in minutes | | | | | |
|---|---|---|---|---|---|---|
| Example | 0 | 2 | 4 | 6 | 8 | 10 |
| 22 | 17.8 | 29.4 | 41.8 | 58.6 | 70 | 76.5 |
| 23 | 10.6 | 12.6 | 21.9 | 52.6 | 70 | 78.8 |
| 24 | 10. | 10.5 | 12.2 | 20 | 31 | 51.5 |
| 25 | 8.2 | 14.5 | 17.7 | 34.4 | 51.3 | 63.4 |

G EXAMPLES 25–27

The examples below use a rigid PVC formulation stabilised by a butylthiotin stabiliser.

| Composition G | |
|---|---|
| Suspension polymerised PVC resin (K-57) | 100 |
| Impact modifier, a copolymer of methylmethacrylate, butadiene and styrene (sold under the trade name Paraloid BTA736S) | 5 |
| Process aid (Paraloid K175) | 1.70 |
| Montanic Acid Ester | 0.3 |
| Hydrogenated Castor Oil | 0.5 |
| Dibutyltin bis(ethylhexylthioglycollate) containing 5% butylin tris(ethylhexylthioglycollate) | 1.5 |

109 g of this mixture was taken as example 25. For example 26, 109 g of Composition G was combined with 0.03 g of dibenzoylmethane and for example 27, 109 g of Composition G was combined with 0.03 g of N-phenyl-3-acetylpyrrolidine-2,4-dione.

The mixtures were mixed by hand and treated as described in section A except that the test oven was maintained at 185° C. The yellowness indices are given in table 9.

TABLE 9

| | Y.I. after oven stability test in minutes | | | | | |
|---|---|---|---|---|---|---|
| Example | 0 | 6 | 12 | 18 | 24 | 30 |
| 25 | 2.5 | 3.2 | 3.9 | 6.6 | 11.4 | 16.6 |
| 26 | 2.8 | 3.0 | 3.9 | 7.9 | 11.9 | 16 |
| 27 | 2.4 | 3.3 | 3.8 | 6.3 | 9 | 12.6 |

H. EXAMPLES 28–30

The example compounds were tested in a flexible clear PVC formulation stabilised by a Calcium/Zinc/Hydrotalcite solid system.

| Composition H | |
|---|---|
| Suspension PVC resin (K-71) | 100 |
| Dioctyl phthalate | 50 |
| Calcium Stearate | 0.5 |
| Zinc Stearate | 0.5 |
| Mg/Al/Zn Hydroxycarbonate (sold under the trade name of Alcamizer 4) | 0.3 |
| Bisphenol A | 0.1 |
| Tris(nonylphenyl) phosphite | 1.0 |

152.4 g of Composition H were taken as example 28. For example 29, 152.4 g of Composition H were combined with 0.025 g of benzoylstearoyl methane. For example 30, 152.4 g of Composition H were combined with 0.025 g of N-phenyl-3-acetyl-pyrrolidine-2,4-dione. These mixtures were treated in an identical manner to that described in section A. The yellowness indices are given in table 10.

TABLE 10

| | Y.I. after oven stability test in minutes | | | | |
|---|---|---|---|---|---|
| Example | 0 | 5 | 10 | 15 | 20 |
| 28 | 0.6 | 1.4 | 9.5 | 10.0 | 15.5 |
| 29 | 1.4 | 2.3 | 4.2 | 5.7 | 8.0 |
| 30 | 0.1 | 1.5 | 1.5 | 3.6 | 6.8 |

I EXAMPLES 31–35

The example compounds were tested in a filled plastisol PVC formulation stabilised by a liquid barium/zinc system.

| Composition I | |
|---|---|
| Emulsion PVC resin (K-79) | 100 |
| Calcium carbonate | 50 |
| Dioctylphthalate | 60 |
| Carbonated Barium alkylphenolate (28% Ba) | 0.5 |
| Basic zinc octoate (22% Zn) | 0.16 |
| Diphenyl isooctylphophite | 0.9 |
| Diphenyl phosphite | 0.2 |
| Butoxyethoxyethanol | 0.2 |

Composition I was mixed in a paddle mixer for 7 minutes. 105.98 g of Composition I was taken as example 31. For examples 32–35 this amount of Composition I was combined with 0.0125 g of dibenzoylmethane, 0.0125 g of N-benzyl-3-acetylpyrrolidine-2,4-dione, 0.005 g of N-benzyl-3-acetylpyrrolidine-2,4-dione, 0.005 g of N-phenyl-3[2-isopropylamino)ethylidine]pyrrolidine-2,4-dione. These mixtures were placed on an oil heated rolling mill under the conditions described in Table 11

TABLE 11

| Roll diameter | 110 mm |
|---|---|
| Front roll temperature | 160° C. |
| Back roll temperature | 160° C. |
| Front roll speed | 26.6 rpm |
| Friction ratio | 1.10 |
| Nip thickness | 0.4 mm |
| Milling time | 2 minutes |

Test pieces were cut from the prepared sheets and placed in a test oven at 190° C. (Mathis Thermotester LTF-ST). The yellowness indices are given in Table 12.

TABLE 12

| | Y.I. after time in oven in mins | | | | | | |
|---|---|---|---|---|---|---|---|
| Example | 0 | 2 | 4 | 6 | 8 | 10 | 12 |
| 31 | 14.5 | 19 | 30.9 | 44.3 | 57.3 | 70 | 88.2 |
| 32 | 11.1 | 11.8 | 13 | 16.7 | 26.4 | 40.8 | 59.4 |
| 33 | 9.5 | 10.9 | 11.9 | 13.4 | 16.6 | 20.5 | 31.4 |
| 34 | 10.7 | 12.2 | 15.8 | 19.1 | 27.9 | 35.7 | 50.6 |
| 35 | 12.8 | 16.6 | 24 | 29.4 | 39.4 | 46.2 | 56.3 |

We claim:

1. A composition based on homopolymers and/or copolymers of vinyl chloride comprising the following compounds, expressed by weight relative to the weight of the polymers:

(a) from 0.1% to 5% of one or more organotin salts and/or one or more divalent metal salts of a carboxylic acid or phenol; and (b) from 0.001% to 5% of one or more organic compounds of the general formula

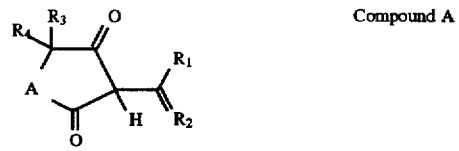

Compound A in which $R_1$ represents a linear or branched alkylene or alkenylene radical having up to 20 carbon atoms, an aralkylene radical having from 7 to 20 carbon atoms or an arylene or cycloalkylene radical having from 6 to 20 carbon atoms, the cycloalkylene radicals optionally containing carbon-carbon double bonds; these radicals optionally being unsubstituted or substituted, by one or more halogen atoms or hydroxyl groups or, for aryl or cycloalkylene radicals, by one or more methyl, ethyl, or methoxy radicals, the above mentioned radicals optionally also being modified by the presence in an aliphatic chain of one or more —O—, —CO— or —$CO_2$— chain members; $R_3$ and $R_4$ are defined as $R_1$ or H and can be the same or different; A is either O, S or $NR_7$, with $R_7$ defined as $R_1$ or H; with the exception that when $R_2$=O, A≠O; and $R_2$ represents O, $NR_5$ or $NNHR_5$ wherein $R_5$ is defined as $R_1$, H or C(S)$NHR_6$ wherein $R_6$ is defined as $R_1$ or H; or $R_2$ represents the following:

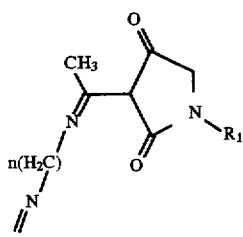

wherein n is an integer between 1 and 10.

2. A composition as claimed in claim 1, wherein the composition comprises from 0.001% to 1% by weight of an organic compound of the general formula of Compound A relative to the weight of polymers.

3. A composition as claimed in claim 1 wherein the organic compound of the general formula Compound A comprises any of the following:
N-phenyl-3-[2-isopropylamine)ethylidene]-pyrrolidine-2,4-dione,
N-phenyl-3-acetyl-5-methylpyrrolidine-2,4-dione,
N-p-methoxyphenyl-3-acetylpyrrolidine-2,4-dione,
N-benzyl-3-acetylpyrrolidine-2,4-dione,
N-isopropyl-3-acetylpyrrolidine-2,4-dione,
N-phenyl-3-acetylpyrrolidine-2,4-dione,
3-[2-(4-methylphenylhydrazine)-ethylidene]-tetronic acid
N-methyl-3-acetylpyrrolidine-2,4-dione,
N-phenyl-3 -[2-(isopropylamino)ethylidene]-pyrrolidine-2,4-dione,
N-p-methylphenyl-3-acetylpyrrolidine-2,4-dione,
3-[2-(4-methylphenyl-hydrazine)-ethylidene]-tetronic acid,
N-phenyl-3 -benzoylpyrrolidine-2,4-dione,
3-acetyltetrahydrothiophen-2,4-dione, or

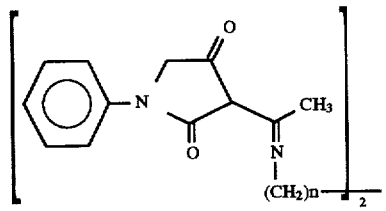

where n=1, 1.5,2.2.5,3,3.5,4,4.5 or 5.

4. A composition as claimed in claim 1, wherein the organic compound of the general formula of Compound A comprises the following substituents: $R_1$=alkyl, $R_2$=O, $R_3$=R4=H and A=$NR_7$ where $R_7$=phenyl.

5. A composition as claimed in claim 1, wherein the organic compound of the general formula of Compound A comprises the following substituents: A=$NR_7$, $R_1$=methyl, $R_2$=O, $R_3$=$R_4$=H where $R_7$=alkyl, aralkyl or substituted phenyl.

6. A composition as claimed in claim 1, wherein the organic compound of the general formula of Compound A comprises the following substituents: A=$NR_7$, $R_1$=aryl, $R_2$=O, $R_3$=R4=H, $R_7$=phenyl.

7. A composition as claimed in claim 1, wherein the organic compound of the general formula of Compound A comprises the following substituents: A=$NR_7$, $R_1$=methyl, $R_2$=O, $R_3$=methyl, $R_4$=H, $R_7$=phenyl.

8. A composition as claimed in claim 1, wherein the organic compound of the general formula of Compound A comprises the following substituents: A=N-phenyl, $R_1$=methyl, $R_3$=$R_4$=H, $R_2$=NH-alkyl and when $R_2$=N-alkyl.

9. A composition as claimed in claim 1 wherein the organotin salt comprises any of the following: methyl-, butyl-, or octyltin carboxylate, maleic acid half ester or mercaptoester salts.

10. A composition as claimed in claim 1 wherein the metal component of the divalent metal salt comprises any of the following: barium, cadmium, zinc, calcium, magnesium or lead salts, barium-cadmium salts, barium-zinc salts or calcium-zinc salts.

11. A composition as claimed in claim 1, wherein the composition further comprises carboxylic acid salts of at least one monovalent metal and/or trivalent metal.

12. A composition as claimed in claim 1, wherein the divalent metal salt comprises any of the following: acetate, ethyl hexanoate, octoate, stearate, oleate, laurate, palmitate, myristate, ricinoleate, benzoate (including alkbenzoate substituted benzoate) phthalate, phenate or nonyl phenate.

13. A composition as claimed in claim 1, wherein the composition further comprises at least one inorganic metal derivatives from the following: oxides, carbonates, sulphates, perchlorates, magnesium/aluminium and magnesium/aluminium/zinc hydroxycarbonates, calcium/aluminium hydroxycarbonates, calcium/aluminium hydroxyphosphite products.

* * * * *